United States Patent [19]

Pedersen

[11] Patent Number: 5,355,618
[45] Date of Patent: Oct. 18, 1994

[54] IRRIGATION VALVE FOR A CULTIVATION TABLE AND RELATED IRRIGATION SYSTEM

[76] Inventor: Leif L. Pedersen, Ågade 25, DK-5270 Odense N, Denmark

[21] Appl. No.: 942,381

[22] Filed: Sep. 9, 1992

[30] Foreign Application Priority Data

Sep. 9, 1991 [DK] Denmark .................. 1581/91

[51] Int. Cl.$^5$ .................................. A01G 9/00
[52] U.S. Cl. .................................. 47/18; 47/62; 239/428.5; 239/553.3
[58] Field of Search ........... 239/428.5, 553.3, 557; 222/630, 637; 47/62, 18, 59

[56] References Cited

U.S. PATENT DOCUMENTS

| | | | |
|---|---|---|---|
| 3,938,738 | 2/1976 | Nagel | 239/428.5 |
| 4,045,909 | 9/1977 | Moss | 239/428.5 |
| 4,261,347 | 4/1981 | Spencer | 239/428.5 |
| 5,182,820 | 2/1993 | Marks | 239/428.5 |

*Primary Examiner*—Henry E. Raduazo
*Attorney, Agent, or Firm*—Antonelli, Terry, Stout & Kraus

[57] ABSTRACT

An irrigation valve adapted to be placed in an inlet pipe for irrigation liquid under a cultivation table for potted plants or the like. The irrigation valve includes a valve housing with an inlet and an outlet as well as a mixing chamber and a nozzle. The valve further includes a lateral opening for enabling an introduction of air to be mixed with the irrigation liquid and for draining of irrigation liquid. A number of the valves may be used in an irrigation plant with one valve being provided under each cultivation table and being activated by a magnetic valve disposed in an inlet pipe for providing water under pressure.

8 Claims, 2 Drawing Sheets

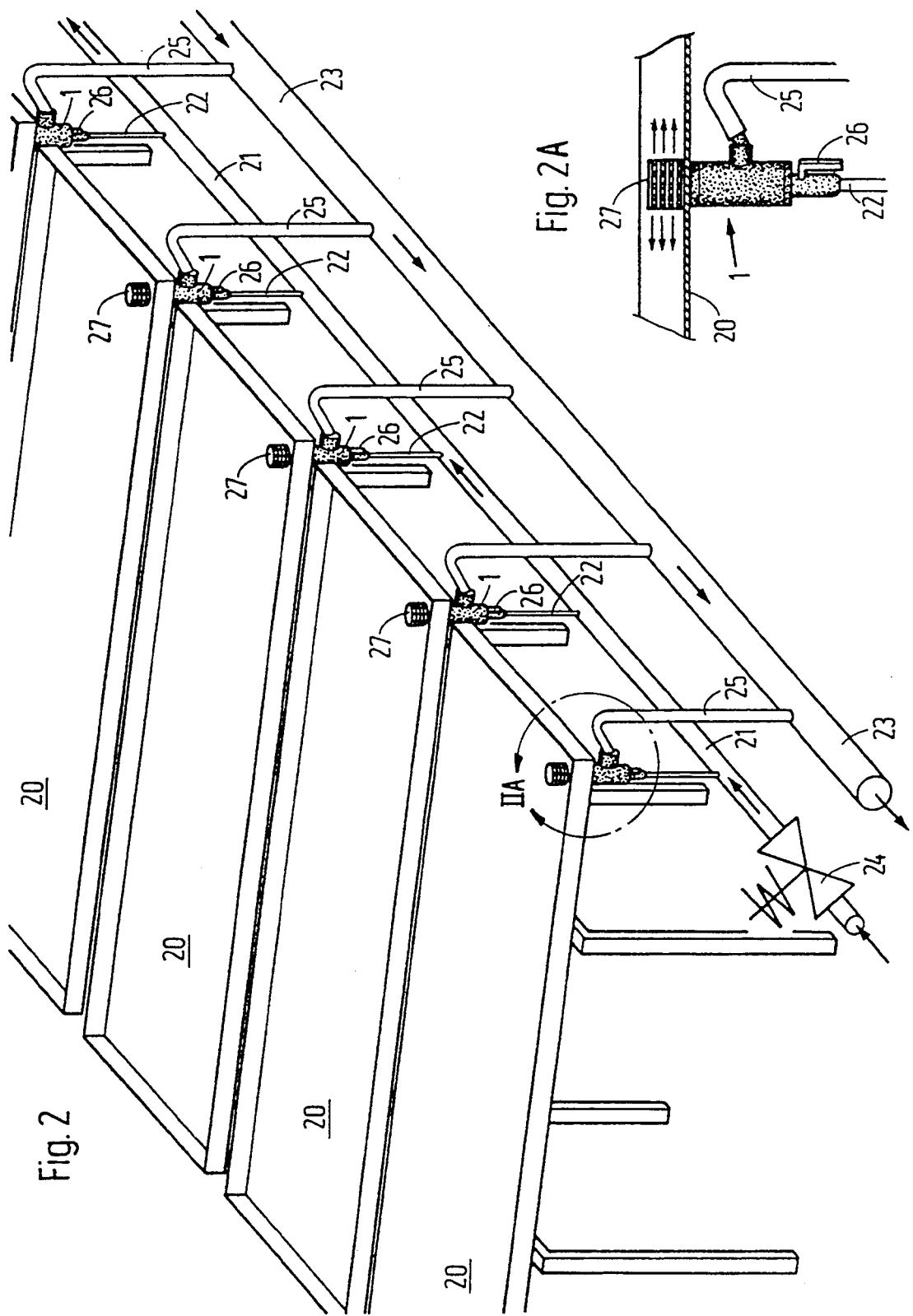

IRRIGATION VALVE FOR A CULTIVATION TABLE AND RELATED IRRIGATION SYSTEM

BACKGROUND OF THE INVENTION

The present invention relates to an irrigation valve adapted to be placed in an inlet pipe for irrigation liquid under a cultivation table for potted plants or the like, with the valve also comprising a means for draining liquid from the table and a means for aerating the liquid.

Valves of this type are used for the control of the introduction as well as the draining of irrigation water and/or nutrient fluid, which in the following will be referred to as irrigation liquid, in connection with cultivation tables on which are placed potted plants, cultivation blocks with plants and the like. At suitable intervals irrigation liquid is led to the table for irrigating the pots at the bottom, after which the liquid is drained for outlet or reuse. This type of irrigation is called ebb-and-flow-irrigation.

In, for example, Danish patent no. 146,812, irrigation valves are arranged in such a manner that the introduction and the draining is carried out through the same pipe, as the valve comprises movable parts providing for the necessary change-over. One of the drawbacks hereby is that the movable parts of the valve may fail, especially because the drained liquid often contains impurities such as algae, plant parts, residues of growth medium, etc. Besides, such valves are complicated and comprise several individual parts.

It is moreover a great advantage if the irrigation liquid is aerated before it is led to the cultivation table, as this increases the growth and results in healthier and stronger plants. Ordinary air, oxygen or $CO_2$ may be used for the aeration depending on the product to be grown on the table. Means are known for the aeration of the irrigation liquid, but these means usually require application of air or gas under pressure and application of atomizer nozzles or the like. Hereby a complicated construction is achieved which requires regular maintenance, cleaning, adjustment, etc.

SUMMARY OF THE INVENTION

Irrigation valve according to the present invention includes a valve housing having an inlet, an outlet, a mixing chamber placed between the inlet and outlet, and one of a narrowing or nozzle to the mixing chamber, with at least one of the mixing chamber or an area connected to the mixing chamber being in communication with a further opening. By virtue of these features of the present invention, particular advantages are achieved in that the valve functions completely without movable parts and the introduction of draining of irrigation liquid is carried out through separate pipes so that a direction of flow does not turn in the pipes. This also allows a faster draining, with the result being an improved root growth and thus healthier plants. The entire sequence relating to the draining from the cultivation table to a storage vessel for irrigation liquid can be established without pumps, as an outlet pipe with a drop toward the vessel is applied. The application of return valves with movable parts in the outlet pipe is also avoided.

At the same time an aeration is carried out without the application of compressed air or other complicated mechanisms for the aeration, as the flow of the water through the nozzle in the irrigation valve produces a suction effect which suctions air up through the outlet pipe for the air to be mixed with water.

Thus, a valve is provided which is completely without movable parts, and which supplies irrigation liquid and introduces air or possibly other gases into the liquid, and drains the water after the irrigation.

In accordance with the invention the further opening comprises an outlet branch directed in an upwardly inclined manner. By virtue of these features, the draining is accelerated due to a siphoning effect in the outlet, without any significant draining taking place during the introduction of a liquid.

In accordance with further features of the present invention, the nozzle is provided with an orifice having edges which are beveled in an inclined manner, and the area is fashioned of an annular chamber surrounding the nozzle disposed below the orifice of the nozzle. Moreover, the further opening advantageously extends from the annular chamber.

The irrigation valve of the present invention includes a valve housing which is substantially cylindrical and which is arranged so as to be placed substantially vertically under a cultivation table, with the outlet branch forming a rising angle, with respect to the horizontal plane of at least 10°.

Additionally, according to the present invention, an irrigation plant may be provided which includes a plurality of cultivation tables, with the irrigation plant including pressure-water piping and an outlet pipe. The pressure-water piping from an inlet pipe leads to each cultivation table through an irrigation valve such as described above, with the further opening of the irrigation valve being connected to the outlet pipe. The pressure-water piping includes at least one valve which, preferably, is constructed as a magnetically operated valve.

In order to ensure that the irrigation liquid is aerated and that the draining of the cultivation tables will be rapid, according to the present invention, an inside diameter of the outlet pipe is substantially larger than an inside diameter of the pressure-water piping.

In accordance with the irrigation plant of the present invention, each inlet pipe is placed or disposed as a closing valve upstream of the irrigation valve. By virtue of these features of the present invention, one or more cultivation tables in a group can be closed off without further action being necessary. In this manner, a further possibility is provided for adjusting the plant without applying complicated techniques.

BRIEF DESCRIPTION OF THE DRAWINGS

An example of an embodiment of a valve according to the invention and an example of the embodiment of an irrigation plant according to the invention are shown in the drawing and explained in further detail in the following with reference to the drawing, wherein:

FIG. 2 is a perspective schematic view of an irrigation plant according to the present invention; and FIG. 2A is an enlarged detail view of the detail IIA in FIG. 2.

DETAILED DESCRIPTION

Figure 1:
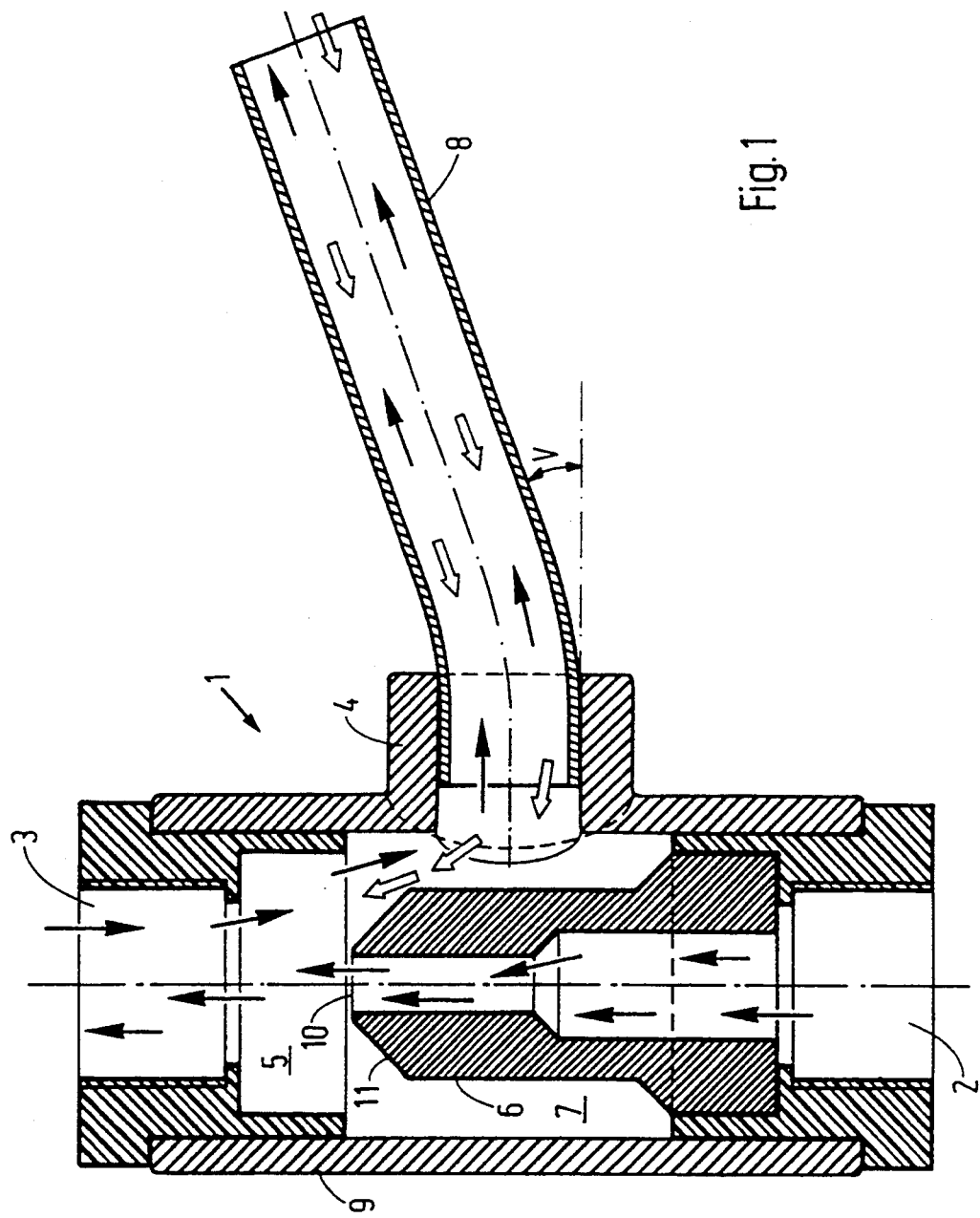
FIG. 1 is a planar axial cross-section through an irrigation valve constructed in accordance with the present invention.

Referring now to the drawings wherein like reference numerals are used in both views to designate like parts and, more particularly, to FIG. 1, according to this Figure, a valve generally designated by the reference numeral 1 comprises a valve housing in the form of a pipe section 9 with an inlet 2 for liquid and an outlet 3, and with a lateral portions in the form of a pipe branch 4, in which an angular pipe section 8 is secured. The pipe section 8 forms an angle V of, preferably, greater than 10°, with respect to a horizontal plane when the valve is arranged vertically. A nozzle 6 is disposed interiorly of the irrigation valve 1, with the nozzle including a nozzle orifice 10 having an inclined, beveled, annular edge 11. Additionally, the valve has two chambers, namely, a mixing chamber 5 above the nozzle and, for example, an annular 7 surrounding the nozzle. The annular chamber 7 is open through a pipe branch 4 for enabling the annular chamber 7 to communicate with the pipe section 8. The mixing chamber 5 and annular chamber 7 are openly connected to each other and, at a top of the chamber 5, the chamber 5 ends in an outlet 3.

The injection valve 1 is arranged for leading aerated water to the cultivation tables and for draining the water from the tables, which is explained in further detail in connection with FIGS. 2 and 2A wherein the irrigation valve 1 is mounted below a plurality of cultivation tables 20.

In FIG. 2 the reference numeral 20 refers to each cultivation table in a group of cultivation tables, where a valve 1 is placed under each table. Via a closing valve 26, which will be explained later on, and a water pipe 22, for example, a 10 mm PE hose, the valve 1 is connected to a pressure pipe 21, for example a 40 mm plastic pipe or PE pipe. An outlet filter 27 mounted on the outlet 3 of the valve 1 ensures that the water flows horizontally out onto the cultivation table. An outlet hose 25, for example, a ¾" plastic or rubber hose, is coupled to the outlet branch 8 of the lateral 4 of the valve 1. The outlet hose 25 leads to a shared outfall or outlet pipe 23, for example, a 110 mm plastic pipe. The arrows in FIG. 2 show the direction of flow of the liquid. The pressure pipe 21 and the outlet pipe 23 usually form part of a closed system together with a vessel (not shown) for irrigation liquid.

The cultivation tables 20 are arranged in groups of, for example, 10–20 tables, which are supplied through a shared pressure pipe 21. In the pressure pipe 21 before the first table in the group is placed a magnet valve 24 which can turn the irrigation liquid on and off.

The functioning of the irrigation valve 1 will be explained in the following.

The irrigation valve 1 will first be explained with reference to FIG. 1. When pressure-water or irrigation liquid is introduced through the inlet 2, the velocity of flow is increased because of the nozzle 6, after which the water flushes up into the mixing chamber 5 and out through the outlet 3 and out onto the cultivation table. Since the valve is open directly through the lateral branch 4, the flow of the water will create a suction effect which will suction air through the outlet branch 8 into the mixing chamber 5. The valve thus aerates the water in a thorough manner, so that the liquid flowing out of the outlet 3 is aerated. When the pressure-water to the inlet 2 is turned off, the flow through the nozzle stops. The water on the cultivation table will automatically be drained away through the lateral 4.

The black arrows in FIG. 1 of the drawing show the direction of flow of the water, and the white arrows show the direction of flow of the air.

Since the outlet branch 8 is directed upwardly in an inclined manner, and it functions as a siphon together with the attached outlet hose 25, so that the draining is carried out as fast as possible.

As apparent from FIG. 2, the valves 1 are arranged under each their pertaining cultivation table. The draining of the cultivation tables will be completed through the outlet hoses 25 and the outlet pipe or outfall 23, the inside diameter of which is substantially larger than that of the pressure-water piping 21, whereby it is ensured that the amount of air in the system to be used for aerating the irrigation liquid is always sufficient, and that there is sufficient space for the water to be drained freely.

With the magnet valve 24 the possibility is thus provided of controlling the irrigation of a number of plant tables completely without other movable parts in the valve 1, and, in such a manner, that, at the same time, the water is aerated immediately before it is supplied to each cultivation table.

The valve 26 under each table is, for example, a simple closing valve, with which a table can be closed off from the irrigation plant if the table is not to be used. Naturally, the valve 26 can be a magnetically actuated valve or another valve which can be operated from a distance.

The valve 1 will usually be cast in plastic, possibly several parts put or threadably assembled.

I claim:

1. Irrigation plant for a plurality of cultivation tables, the irrigation plant comprising a pressure-water piping, an outlet pipe an inlet pipe extending from the pressure-water piping respectively leads to each cultivation table, an irrigation valve provided in each inlet pipe, said irrigation valve including means for draining liquid from the table, means for aerating the liquid, a valve housing including an inlet, an outlet, and a mixing chamber disposed between the inlet and the outlet, and one of a narrowing or a nozzle provided at the mixing chamber, with at least one of the mixing chamber and an area connected to the mixing chamber being in communication with a further opening, and wherein the further opening of the irrigation valve is connected to the outlet pipe, and wherein the pressure-water piping includes at least one valve.

2. Irrigation plant according to claim 1, wherein an inside diameter of the outlet pipe is substantially larger than an inside diameter of the pressure-water piping.

3. Irrigation plant according to one of claims 1 or 2, wherein each inlet pipe is a closing valve disposed upstream of the irrigation valve.

4. Irrigation plant according to claim 1, wherein the at least one valve is an electromagnetic valve.

5. Irrigation plant according to one of claims 1 or 4, wherein said further opening comprises an outlet branch being directed in an upwardly inclined manner.

6. Irrigation plant according to claim 5, wherein the nozzle includes an orifice with edges bevelled in an inclined manner, and wherein the area is fashioned as an annular chamber surrounding the nozzle and disposed below the orifice.

7. Irrigation plant according to claim 6, wherein the further opening extends from the annular chamber.

8. Irrigation plant according to claim 5, wherein the valve housing is substantially cylindrical and is arranged to be placed substantially vertically under a cultivation table, and wherein the outlet branch forms a rising angle with a horizontal plane of at least 10°.

* * * * *